US009756189B2

(12) United States Patent
Bhattacharya et al.

(10) Patent No.: US 9,756,189 B2
(45) Date of Patent: *Sep. 5, 2017

(54) METHOD AND SYSTEM FOR ROUTING AND SECURITY FOR TELEPHONE CALLS OVER A PACKET-SWITCHED NETWORK

(71) Applicant: Alcatel Lucent, Boulogne-Billancourt (FR)

(72) Inventors: Saswata Bhattacharya, Sayreville, NJ (US); Mahendra Pratap, Cliffwood Beach, NJ (US); Harvey S. Schultz, Manalapan, NJ (US); Quan Li, Edison, NJ (US); Serafim Maroulis, Aberdeen, NJ (US)

(73) Assignee: Alcatel Lucent, Boulogne-Billancourt (FR)

( * ) Notice: Subject to any disclaimer, the term of this patent is extended or adjusted under 35 U.S.C. 154(b) by 0 days.

This patent is subject to a terminal disclaimer.

(21) Appl. No.: 14/627,636

(22) Filed: Feb. 20, 2015

(65) Prior Publication Data

US 2015/0229771 A1 Aug. 13, 2015

Related U.S. Application Data

(63) Continuation of application No. 13/493,343, filed on Jun. 11, 2012, now Pat. No. 8,982,875, which is a
(Continued)

(51) Int. Cl.
*H04M 7/12* (2006.01)
*H04L 29/06* (2006.01)
(Continued)

(52) U.S. Cl.
CPC ...... *H04M 7/128* (2013.01); *H04L 29/06027* (2013.01); *H04L 65/1043* (2013.01);
(Continued)

(58) Field of Classification Search
CPC ............ H04L 65/1043; H04L 65/1069; H04M 7/0078; H04M 7/1285
See application file for complete search history.

(56) References Cited

U.S. PATENT DOCUMENTS 5,113,499 A 5/1992 Ankney et al.
5,365,572 A 11/1994 Saegusa et al.
(Continued)

OTHER PUBLICATIONS

U.S. Appl. No. 60/059,087, Internet Communications Clearinghouse System, Dalton, James P.G., filed Sep. 16, 1997, 155 pages.

*Primary Examiner* — Donald Mills
*Assistant Examiner* — Henry Baron
(74) *Attorney, Agent, or Firm* — Tong, Rea, Bentley & Kim, LLC

(57) ABSTRACT

A server, upon receiving a request to complete a call over a packet-switched network, looks up an address on the packet-switched network on a local table. If the local table does not contain a matching address, the server asks a routing server to identify a receiving server address. The routing server identifies a suitable address and sends a message to the originating server containing the address. The routing server may consider such factors as the volume of calls currently being handled by various potential receiving servers in selecting a receiving server. The receiving server then receives, via the packet-switched network, a message requesting a telephone connection to a second telephone device. Before completing the connection to the second telephone device, information in the message representing the address of the device on the packet-switched network that originated the message is identified. The address information is compared to selected predetermined addresses for permitted origins of the message. The permitted origins may be other servers or clients of the receiving server. If the address in the message corresponds to a predetermined
(Continued)

permitted address, the server will proceed with completion of the call. If the address in the message does not correspond to a predetermined permitted address, the server will refuse to complete the call.

2 Claims, 4 Drawing Sheets

Related U.S. Application Data continuation of application No. 10/171,026, filed on Jun. 13, 2002, now Pat. No. 8,254,371, which is a continuation of application No. 09/105,728, filed on Jun. 26, 1998, now abandoned.

(51) Int. Cl.
  *H04M 7/00* (2006.01)
  *H04M 3/38* (2006.01)
(52) U.S. Cl.
  CPC ...... *H04L 65/1069* (2013.01); *H04M 7/0078* (2013.01); *H04M 7/1285* (2013.01); *H04L 63/10* (2013.01); *H04M 3/38* (2013.01)

(56) References Cited

U.S. PATENT DOCUMENTS

| | | | |
|---|---|---|---|
| 5,526,489 | A | 6/1996 | Nilakantan et al. |
| 5,608,786 | A | 3/1997 | Gordan |
| 5,638,515 | A | 6/1997 | Futral |
| 6,014,379 | A | 1/2000 | White et al. |
| 6,233,234 | B1 | 5/2001 | Curry et al. |
| 6,259,691 | B1 | 7/2001 | Naudus |
| 6,418,216 | B1 | 7/2002 | Harrison et al. |
| 6,426,955 | B1 | 7/2002 | Gossett et al. |
| 6,430,275 | B1 | 8/2002 | Voit et al. |
| 6,584,094 | B2 | 6/2003 | Maroulis et al. |
| 6,594,230 | B1 | 7/2003 | Yaker |
| 6,597,686 | B1 * | 7/2003 | Smyk ............... H04L 12/6418 370/252 |
| 6,606,668 | B1 | 8/2003 | MeLampy et al. |
| 7,149,208 | B2 | 12/2006 | Mattaway et al. |
| 7,948,968 | B2 | 5/2011 | Voit et al. |
| 2005/0188092 | A1 * | 8/2005 | Short ............... H04L 29/06 709/227 |
| 2008/0194251 | A1 * | 8/2008 | Tischer ............... H04L 12/66 455/426.1 |
| 2009/0059818 | A1 | 3/2009 | Pickett |

* cited by examiner

METHOD AND SYSTEM FOR ROUTING AND SECURITY FOR TELEPHONE CALLS OVER A PACKET-SWITCHED NETWORK

CROSS REFERENCE TO RELATED APPLICATIONS

The present application is a continuation of pending U.S. patent application Ser. No. 13/493,343, filed on Jun. 11, 2012, entitled "Method and System for Routing and Security for Telephone Calls Over a Packet-Switched Network," which application is a continuation of U.S. patent application Ser. No. 10/171,026, filed on Jun. 13, 2002, entitled "Method and System for Routing and Security for Telephone Calls Over a Packet-Switched Network," which application is a continuation of abandoned U.S. patent application Ser. No. 09/105,728, filed on Jun. 26, 1998, entitled "Method And System For Routing And Security For Telephone Calls Over A Packet-Switched Network," each of which is incorporated herein by reference as if set forth in its entirety.

FIELD OF THE INVENTION

This invention relates to providing for telephone calls over packet-switched networks, such as the Internet, and in particular to security and routing for a server receiving requests over a packet-switched network to complete telephone calls.

BACKGROUND

Conventionally, telephone calls, including voice calls, fax transmissions, and data transmissions between computers, are carried over circuit switched telephone networks. Circuit switched telephone networks provide a very reliable switched path between endpoints. However, the cost of telephone calls over circuit switched telephone networks over more than short distances, particularly long-distance and international calling, is very significant.

One solution that has been proposed is providing telephone connections via packet-switched networks, such as the Internet. In packet-switched networks, messages are broken into individual packets, which are separately transmitted over the network to a destination. Alternative pricing schemes are available in such networks.

In techniques for telephony over packet-switched networks, a telephone call is initiated at a computer, or at a telephone device and then transmitted to a computer. The computer then sends messages over the packet-switched network to a receiving server. The receiving server forms a telephone connection to a receiving telephone device. For example, the initiating telephone device and server may be in one country, and the receiving server and receiving telephone device located in a second country. The inventors have noted that there is a risk that unauthorized parties may employ the second server to complete their telephone calls over the packet-switched network.

A system may provide more than one server that is capable of completing a call to a destination telephone number. The gateway that originates the call may not have current information available to determine which of those servers would be most efficient to use to complete the call.

SUMMARY OF THE INVENTION

In a method according to the invention, a server has the capability of receiving telephone calls and directing the telephone calls over a packet-switched network to a second server. The originating server, upon receiving a request to complete a call over a packet-switched network, looks up an address on the packet-switched network in a local table. If the local table does not contain a matching address, the server asks a routing server to identify a receiving server address. The routing server identifies a suitable address and sends a message to the originating server containing the address. The routing server may consider such factors as the volume of calls currently being handled by various potential receiving servers in selecting a receiving server. The originating server sends a message to the receiving server over a packet switched network. Upon receiving the message requesting and before completing the connection to the second telephone device, information in the message representing the address of the originating server on the packet-switched network is identified. The address information is compared to selected predetermined addresses for permitted origins of the message. The permitted origins may be other servers or clients of the receiving server. If the address in the message corresponds to a predetermined permitted address, the server will proceed with completion of the call. If the address in the message does not correspond to a predetermined permitted address, the receiving server will not complete the call.

DETAILED DESCRIPTION OF AN EMBODIMENT

Figure 1:
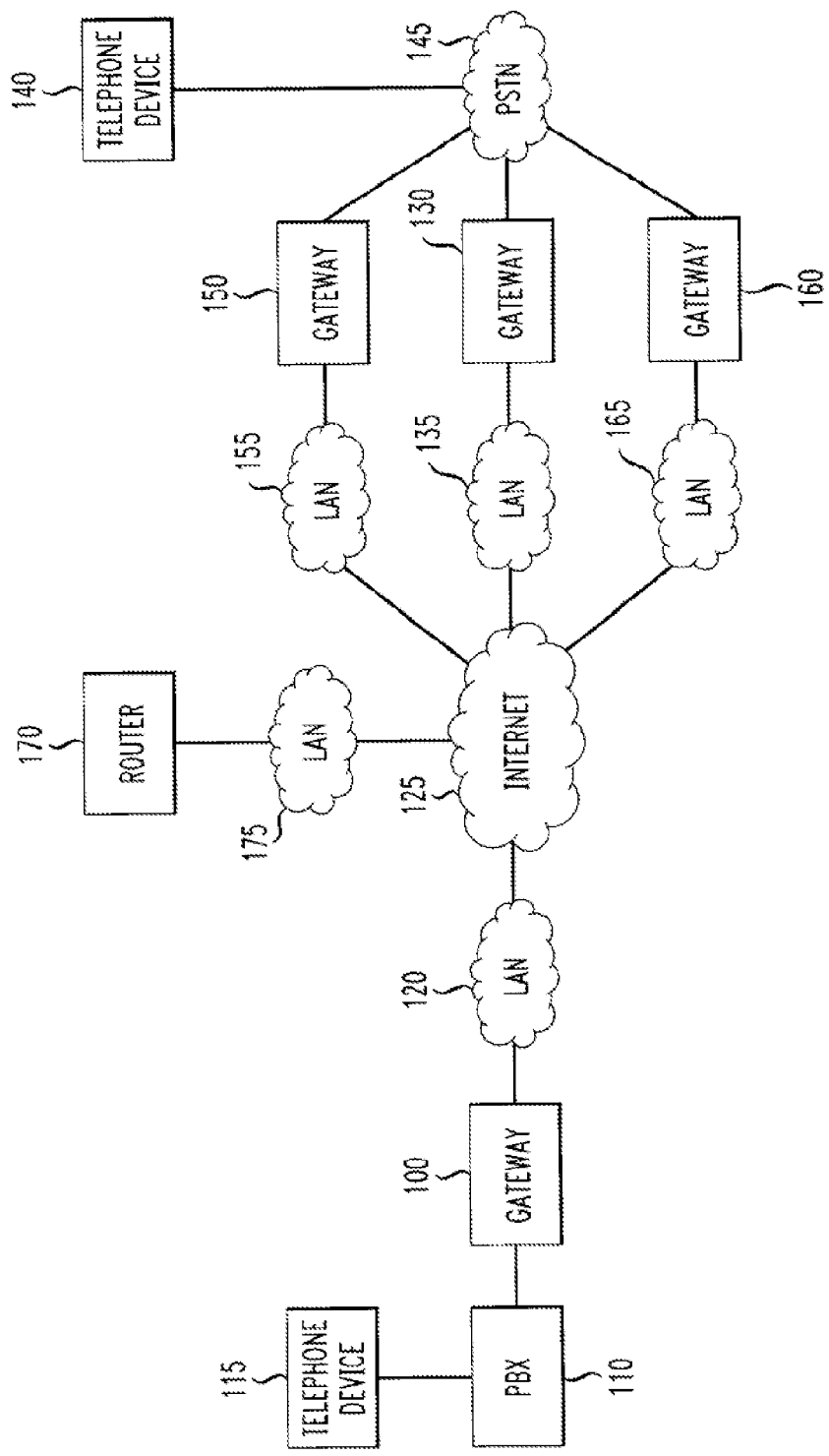
FIG. 1 is a schematic diagram of a system including the invention in an illustrative operational environment.

Referring now to FIG. 1, there is shown a schematic diagram showing an overall system including the invention in an illustrative operational environment. There is shown a first gateway, or Internet telephony server 100. Connected to first gateway 100 via PBX interface 105 and private branch exchange (PBX) 110 is a telephone device 115. PBX interface 110 may include any suitable telephone line, including T1, ISDN PRI, E1, or ISDN EPRI. First gateway 100 is also connected to a packet switched network, such as the Internet 125, via LAN 120. Second gateway 130 is also connected to the Internet via second LAN 135. Second gateway 130 is capable of communicating with second telephone device 140 via public switched telephone network (PSTN) 145. Telephone devices 115 and 140 may be any suitable devices that communicate over telephone lines, including voice telephones, fax machines, or modems. Third gateway 150 is also connected to the Internet, via third LAN 155, and fourth gateway 160 is connected to the Internet via fourth LAN 165. Router 170 is also attached to the Internet, via fifth LAN 175.

Figure 2:
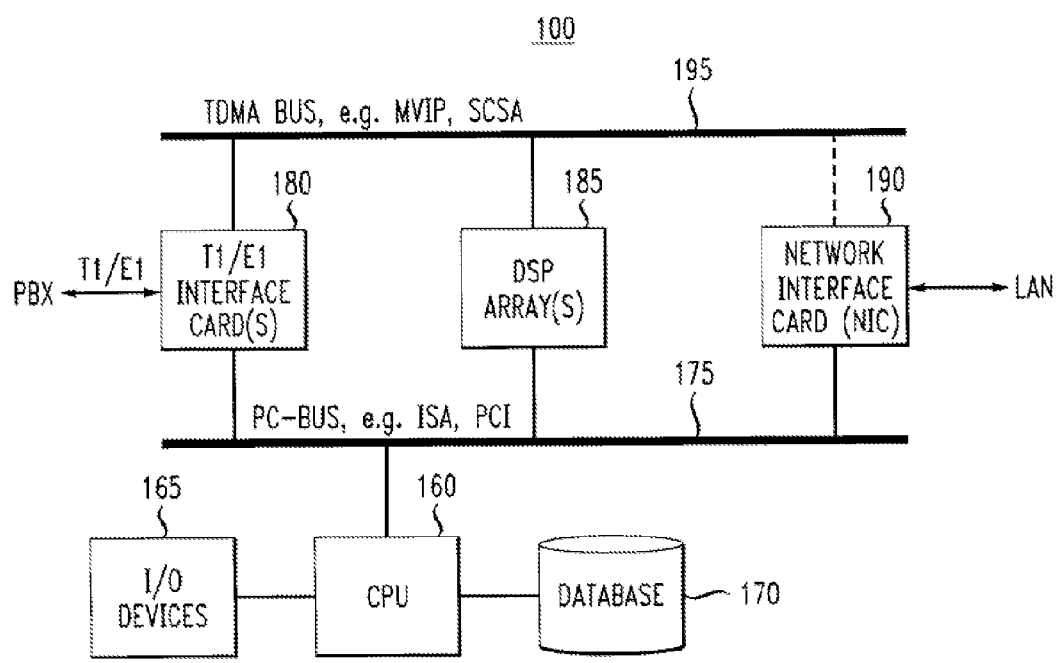
FIG. 2 is a schematic diagram of a server in accordance with the invention.

Referring now to FIG. 2, there is shown a schematic diagram of Internet telephony servers 100 and 130. Server 100 includes central processing unit (CPU) 160. CPU 160 may be based on a suitable microprocessor, such as the Pentium (R) chip from Intel. Central processing unit 160 communicates in a conventional manner with input and output devices 165, such as monitor, keyboard, and mouse, and storage devices 170. CPU 160 is also coupled to a PC-bus 175. PC-bus 175 is coupled to telephone interface cards 180, digital signal processor arrays 185, and network interface card 190. Telephone interface cards 180 are coupled via a suitable line to PBX 110. Telephone interface card 180 on server 130 may also be coupled to telephone lines connecting to public switched telephone network 145. Network interface card 190 is coupled to LAN 120. A second bus 195, which may be, for example, a TDMA bus, such as a MVIP or SCSA bus, is also provided for transporting voice data between the telephone interface cards 180 and DSP array 185. The system may optionally be configured with NIC 190 coupled to TDMA bus 195. This permits voice data to be exchanged between DSP arrays 185 and NIC cards 190.

Figure 3:
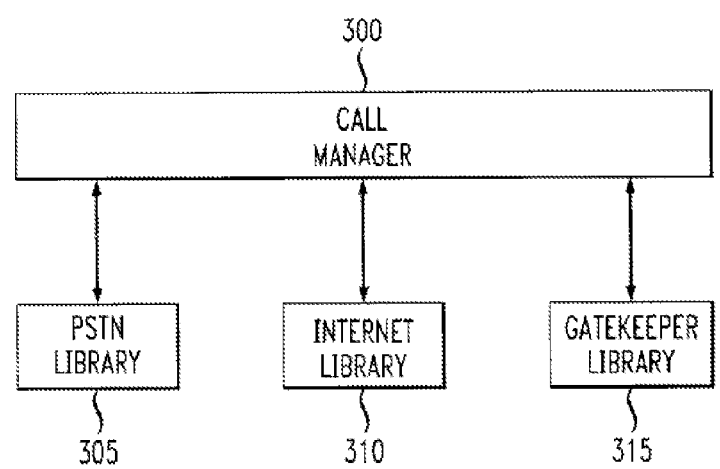
FIG. 3 is a schematic diagram showing software components in an illustrative system designed in accordance with the principles of the invention.

Referring now to FIG. 3, there are shown the major software components of Internet telephony server (ITS) 100 that are involved in call processing functions. The call manager 300 performs overall supervision of a call between the public switched telephone network (PSTN) and the Internet. Call manager 300 interacts with a number of dynamic link libraries in performing this task. Other components are the PSTN library 305, the Internet Library 310, and the gatekeeper library 315. These components are known collectively as call processing components. Each of these components operates through lower level software in well-known manners. Additional components, known generally as infrastructure components, include an activity/trace recorder, a configurator, a database library, and a timer. The infrastructure components are not shown.

Figure 4:
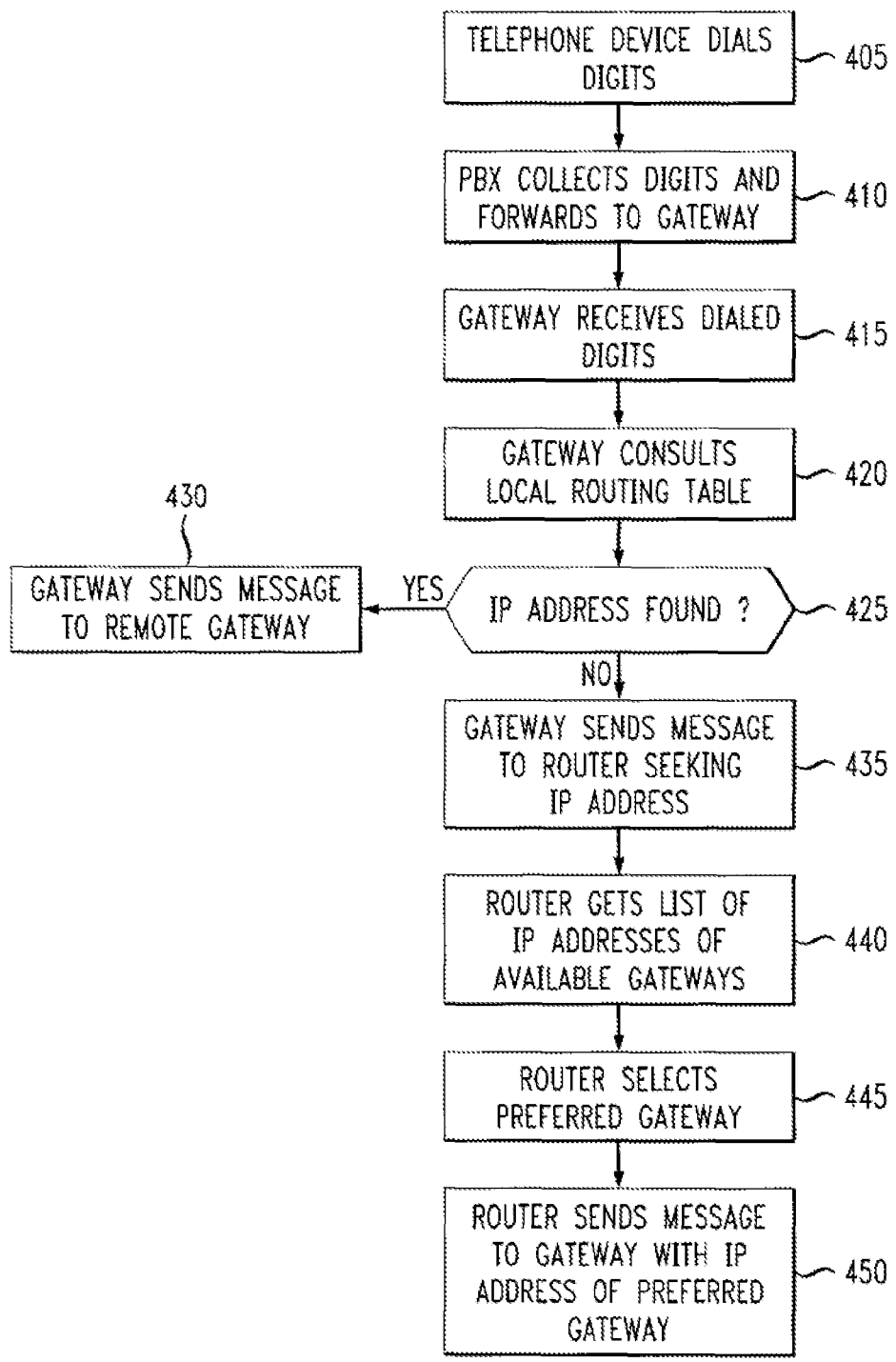
FIG. 4 is a flow chart illustrating steps in a method according to the invention.

Referring now to FIG. 4, there are illustrated the steps in a process of obtaining a route for a telephone call over a packet-switched network in a method according to the invention. As indicated by block 405, the first step is the dialing of a telephone number by first telephone device 115. As indicated by block 410, the next step is for PBX 110 to collect the dialed digits and forward them to first gateway 100. First gateway 100 receives the dialed digits, as indicated by block 415. First gateway 100 then consults a local routing table to determine the Internet protocol address of a remote gateway corresponding to the dialed telephone number is provided, as indicated by block 420. If the Internet protocol address is found, as indicated by the line labeled YES leading from decision block 425, gateway 100 then proceeds, as indicated by block 430, to send a message containing the dialed digits and requesting a telephone call to the designated remote gateway, one of gateways 130, 150, 160, over the Internet.

If the Internet protocol address is not found, as indicated by the line labeled NO leading from decision block 425, gateway 100 sends, as indicated by block 435, a message to router 170 containing the destination telephone number. The message is preferably sent via the Internet. Router 170 preferably can be communicated with over the packet-switched network by all gateways in the system. In principle, gateways could communicate with router 170 by modem over the public-switched telephone network or other suitable network. As indicated by block 440, router 170, on receipt of the message, obtains, from a table, a list of Internet protocol addresses, which are addresses of gateways which can efficiently connect with the destination telephone number. Predetermined criteria are established for identifying the list of suitable gateways. For example, a predetermined list of gateways may be established for each area code or each exchange. The router then selects a preferred gateway, as indicated by block 445. For example, each gateway may periodically send a message over the Internet to the router indicating, for example, the number of calls it is handling, or the number of additional calls it can handle. Gateways may also send messages to the router each time predetermined events take place, such as being turned on or turned off. The router can add and delete gateways from the table of available gateways based on this information. The router stores this information in a table. The router will select a gateway based on predetermined criteria, such as the gateway handling the fewest number of calls, or the gateway having available the greatest additional capacity. The router then sends a message to gateway 100 over the packet-switched network with the Internet protocol address of the selected router, as indicated by block 450.

Figure 5:
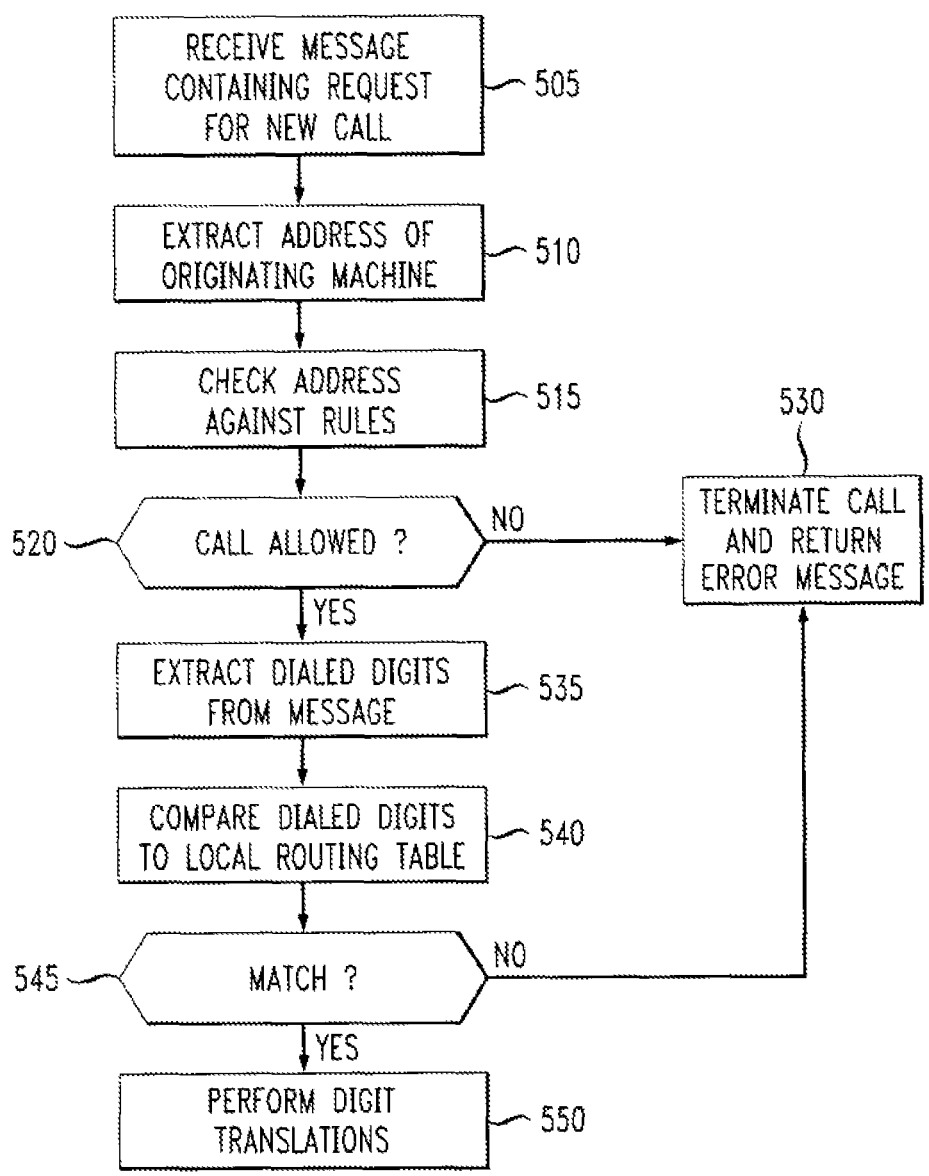
FIG. 5 is a flow chart illustrating steps in another aspect of a method according to the invention.

FIG. 5 sets forth the steps at the receiving gateway 130 upon receipt of a message over the packet-switched network requesting completion of a new call. As indicated in block 505, the first step is the receipt of a message containing a request for a new call. The address of the originating machine, which is the Internet protocol address, is extracted by Internet library from the header of the message. This step is indicated by block 510. The Internet library generates a message to call manager designated inetMSG_CALL__NEW. This message requests a new call to be created. The Internet library includes in a source address field of the message inetMSG_CALL_NEW the extracted address. Call manager then requests of the gatekeeper library to check the address against a set of rules in a specified file. Call manager does so by calling the function GklpCheck. This is indicated by block 515.

The file to be checked will have a series of rules. The rules may have the following format: Source Type|Source Address|Format|Mask|Action|Rejection Code Source Type specifies the type of machine requesting a connection. For example, the machine may be another Internet telephony server, such as server 100 of FIG. 1, in which case the value of Source Type is PEER. Alternatively, the machine may be a personal computer client of the server, in which case the value of Source Type is CLIENT. Source Address specifies the address of the machine requesting the connection. Typically, this will be a dotted decimal Internet protocol address in the form "a.b.c.d". Format indicates the format of the Source Address field; for example, the format may designate that the Source Address is in Internet protocol format. Mask is an integer that expresses a subnet mask. Action indicates the action to be taken by the server for any call to which the current rule applies. Values of "Action" may be ACCEPT or REJECT. Rejection Code is to be included in the returned message to call manager to indicate why the call was rejected. This field can be left empty if the Action field is ACCEPT. If the Action field is REJECT, a cause code, such as INVALID-CALLER, will be placed in the Rejection Code field.

The program proceeds through the list of rules sequentially until there is a match. The action field of the first match determines whether or not the call is to be completed. A match occurs when the leftmost "mask" bits of the binary version of the originating Internet protocol address matches the leftmost "mask" bits of the Internet protocol address, after conversion of the Internet protocol address to binary format. A file might include a series of rules for addresses of permitted callers. The last rule would match all addresses, by placing 0.0.0.0 in the "Source Address", and placing REJECT in the "Action" field, so that any address remaining after the identified permitted addresses would be rejected.

Once either an ACCEPT or REJECT action has been identified, gatekeeper library generates a message gkMSG_IP_CHECKED to call manager. This message includes the Action code. At this point in the process, the determination of whether or not the originating address is permitted to make calls has been completed, as shown by block 520. If the code is REJECT, call manager calls the function inetCallClear from the Internet library, which terminates the call and returns a message over the Internet to the originating device indicating an error. This is illustrated by block 530. If the code is ACCEPT, call manager proceeds with further processing of the call.

If the originating device is permitted to place calls through the receiving gateway, then the next step is for the receiving gateway to extract the dialed digits from the message, as indicated by block 535. The dialed digits are stored in a defined memory location. The next step is to compare the dialed digits to the digits in a local routing table for a match in digit pattern, as shown by block 540. The local routing table contains information identifying, for example, those exchanges and area codes to which the receiving gateway is permitted to make calls. If no match is found, then the call is terminated, and an appropriate message is returned over the Internet to the originating server, as indicated by block 545 and the line marked NO leading to block 530. If a match is found, gateway 130 proceeds to the next step, which is performing any required digit translations from the destination telephone number as contained in the message to the destination telephone number as it must be dialed, as indicated by block 550. For example, if the call from the gateway to the destination telephone device is a local call over the public switched telephone network, area codes would be stripped from the number during translation.

It will be seen that the foregoing method provides security for the receiving server. Only those servers and clients previously designated may complete calls through the receiving server. Also, there is no need to provide a separate field in the message from the originating server or client. Rather, the Internet protocol address, which is automatically included in the header in packets for transmission of Internet messages, is used for security purposes.

It will be understood that all of the various operations carried out by the gateways and router are carried out by processors acting under the control of computer programs. These computer programs may be stored and distributed in any suitable storage medium, such as fixed disk, portable diskettes, and CD-ROM or other read-only memories. Also, methods described as being carried out in software running on general-purpose computer hardware may be implemented in hardware.

It will be understood that various changes in the details, materials and arrangements of the methods and systems which have been described and illustrated above in order to explain the nature of this invention may be made by those skilled in the art without departing from the principle and scope of the invention as recited in the following claims.

What is claimed is:

1. An apparatus, for use at a first gateway configured to be disposed between a call source device and a packet-switched network, comprising:
a processor and a memory communicatively connected to the processor, the processor configured to:
receive, at the first gateway, a message requesting call initiation to a call destination device;
determine whether an Internet Protocol (IP) address of a second gateway configured to serve the call destination device is specified in a local routing table; and
based on a determination that an IP address of a second gateway configured to serve the call destination device is not specified in the local routing table:
send, from the first gateway toward a network device, a gateway address request message comprising a request for an IP address of a second gateway.

2. An apparatus, comprising:
a processor and a memory communicatively connected to the processor, the processor configured to:
receive, at a network device from a first gateway configured to be disposed between a call source device and a packet-switched network, a request for an Internet Protocol (IP) address of a second gateway configured to serve a call destination device; and
determine, at the network device and based on the call destination device, the IP address of the second gateway configured to serve the call destination device.

* * * * *